US005641434A

United States Patent [19]
Yamada et al.

[11] Patent Number: 5,641,434
[45] Date of Patent: Jun. 24, 1997

[54] SILICON NITRIDE POWDER

[75] Inventors: Tetsuo Yamada; Takeshi Yamao; Tetsuo Nakayasu, all of Ube, Japan

[73] Assignee: Ube Industries Ltd., Yamaguchi, Japan

[21] Appl. No.: 512,933

[22] Filed: Aug. 9, 1995

[30] Foreign Application Priority Data

Aug. 12, 1994 [JP] Japan .................................. 6-190785
Jun. 16, 1995 [JP] Japan .................................. 7-149902

[51] Int. Cl.$^6$ .............................. C01B 21/68; B01J 13/00
[52] U.S. Cl. ...................... 252/313.1; 423/344; 501/97.1
[58] Field of Search ........................... 423/344; 252/313.1

[56] References Cited

U.S. PATENT DOCUMENTS

| | | | |
|---|---|---|---|
| 4,122,155 | 10/1978 | Prochazka et al. | 423/344 |
| 4,710,368 | 12/1987 | Ritsko et al. | 423/344 |
| 4,929,432 | 5/1990 | Shen | 423/344 |
| 5,126,295 | 6/1992 | Uchino et al. | 423/344 |
| 5,348,919 | 9/1994 | Kuwabara et al. | 423/344 |

*Primary Examiner*—Wayne Langel
*Attorney, Agent, or Firm*—Finnegan, Henderson, Farabow, Garrett & Dunner, L.L.P.

[57] ABSTRACT

A silicon nitride powder which provides a water-based slurry with a low viscosity and a high powder concentration. The silicon nitride powder has a specific surface area of 6 to 25 m$^2$/g, a number of coarse particles of coarse primary particles, agglomerated particles and/or fused particles, and having a size of 3 to 50 μm, of not more than 1000 per 1 cm$^3$ of the powder, a number of foreign metallic particles, having a size of more than 20 μm, of not more than 3 per 1 cm$^3$ of the powder, and a number of foreign metallic particles, having a size of 10 to 20 μm, of not more than 15 per 1 cm$^3$ of the powder.

11 Claims, No Drawings

SILICON NITRIDE POWDER

BACKGROUND OF THE INVENTION

1. Field of the Invention

The present invention relates to an easy-sintering silicon nitride powder providing a high strength and very reliable silicon nitride-based sintered body. The present invention also relates to a silicon nitride powder which can be used for easily preparing a low viscosity silicon nitride-containing slurry as a starting material for commercially producing a silicon nitride-based sintered body. Silicon nitride-based sintered bodies, one of structural ceramics, are widely used as cutting tips, engine parts, gas turbine components, nozzles for casting, bearing parts, etc. since the bodies are excellent in mechanical properties such as strength, toughness and thermal shock resistance and in other characteristics such as heat resistance and chemical resistance.

2. Description of the Related Art

Known production methods of silicon nitride powder for use as a starting material for a silicon nitride-based sintered body include (1) direct nitridation of metallic silicon, (2) carbothermal reduction and nitridation of silica and (3) thermal decomposition of silicon diimide. These methods have been improved and can provide sintered bodies having enhanced mechanical properties, heat resistance and the like and, recently, can now produce bodies having high purity, a super fine particle size, a high α-phase content, etc. and having a metallic impurity content, an oxygen content, a particle size and a specific surface area and like which are similar.

It is generally known that properties such as mechanical characteristics and heat resistance of silicon nitride-based sintered bodies are greatly influenced by coarse particles such as coarse primary particles, agglomerated particles and/or fused particles present in the silicon nitride powder as the starting material. The powder prepared in accordance with the method (1) contains a large number of coarse primary particles which were not ground in the milling process of the coarse lumps formed by the direct nitridation reaction, the powder prepared in accordance with the method (2) contains a large number of coarse particles by fusion of the starting silica particles and the powder prepared in accordance with the method (3) contains a large number of coarse particles by agglomeration of fine particles.

The content of the coarse particles such as coarse primary particles, agglomerated particles and/or fused particles present in the silicon nitride powder has been qualitatively measured by observing the particle size and state of the primary particles through a scanning electron microscopic photograph or transmission electron photomicrograph or quantitatively measured by particle size distribution analysis through centrifugal sedimentation method light scattering method, a laser diffraction method, a Coulter counter method, etc. and particle size distribution analysis by a screening method, etc.

The measurement of the coarse particles through the scanning or transmission electron photomicrograph lacks reproducibility due to the small area of the measurement and it is difficult to determine the particle size distribution of agglomerated particles and, thus, a quantitative measurement. The measurement of the coarse particles by any particle size distribution analyzer is on the particle size of the secondary particles and the measuring limit thereof is on the order of %, which make it difficult to reproducibly measure the number of coarse particles in an amount of 0.1% or less.

It is known that the mechanical properties, and other characteristics such as heat resistance and chemical resistance, of a silicon nitride-based sintered body are greatly influenced by coarse particles and foreign particles in the silicon nitride powder. However, a method for measuring the number of coarse particles has not been proposed and quantitative analysis of the influence of the number of coarse particles on various properties of the sintered body has not been reported. This is because there are problems in that a method of quantitative measuring the number of coarse particles has not been established and, therefore, it has not been possible to prepare an easily-sinterable silicon nitride powder with a reduced number of coarse particles which would reliably produce a high strength sintered body.

The silicon nitride sintered body is typically produced by forming a desired shaped body of a silicon nitride powder followed by sintering the same.

Particularly in the commercial production of silicon nitride sintered bodies, the forming process comprises a step of preparing a slurry of the starting powder and it is critical to provide a low viscosity silicon nitride powder-containing slurry.

The known method for providing a shaped body of a silicon nitride powder includes rubber pressing, die pressing, hot pressing, extrusion, injection molding, slip casting, etc. For example, the rubber pressing and die pressing use flowable spray dried granules as the starting material for shaping. If the granules low in flowability are used, the shaped body is non-uniform or the density distribution is not uniform and thus the shrinkage during sintering becomes non-uniform to cause deformation and cracking.

The preparation of granules by spray drying requires an adequate slurry flowability range and the usual slurry viscosity is in a range of 50 to 500 cP, preferably 100 to 400 cP. If the viscosity of the slurry is to high, the slurry supplied to an atomizer of a dryer may disadvantageously block a supply pipe or the outlet for blowing the slurry. If the viscosity of the slurry is to low, the coarse components in the slurry deposit while being supplied to make the composition of the slurry non-uniform and, further, the obtained pellets are too small and have low the flowability.

Accordingly, if the viscosity of a slurry is too high, solvent is added to reduce the ratio of the powder to the solvent in volume and to adjust the viscosity. If the viscosity of a slurry is too low, powder is added to increase the ratio of the powder to the solvent in volume and to adjust the viscosity.

On the other hand, if a slurry with a low powder ratio is dried with spray, the resultant granules may have decents and may even have the form of a doughnut, lowering the flowability. Also, a slurry with a low powder ratio requires a large amount of heat to evaporate the solvent, which lowers the productivity.

Thus, it is necessary that a slurry with as high a powder ratio as possible be prepared and spray dried to form spherical granules with high flowability.

Also, slurry for slip-casting must have an adequate viscosity, typically 50 to 500 cP, preferably 100 to 400 cP. If the viscosity of the slurry is too high, it is difficult for the slurry to conform to intricate portions of the mold, discharging the slurry is difficult, and cracks may appear during drying. If the viscosity is too low, coarse components in the slurry may precipitate during the deposition step, causing a non-uniform composition of the cast, and the slurry may run out from a slit in the mold.

Accordingly, if the viscosity of the slurry is high, a solvent is added to lower the powder ratio and adjust the viscosity.

If the viscosity of the slurry is low, a powder is added to increase the powder ratio and adjust the viscosity.

Slip-casting with a slurry having a low powder ratio results in a slow rate of deposition and a long time of shaping, which is not favorable for productivity. Also, it causes an increase in the shrinkage of the cast during drying and sintering, causing cracking.

Thus, it is generally preferable to prepare a slurry with as high a powder ratio as possible.

An excellent shaped body can be easily obtained with a slurry having a high ratio of powder to solvent and a low viscosity. However, since a slurry for shaping silicon nitride ceramics contains a binder for holding the shape of the formed body such as polyvinyl alcohol, polyethylene glycol or acrylate-based copolymer resin, the viscosity becomes high so that it is difficult to adjust the viscosity of the slurry to a preferable value. As a result, conventionally, there is a problem that although the amount of the binder should be increased to obtain a precise shape, the increased binder results in an increase in the viscosity of the slurry containing a powder with a specific surface area of 6 to 25 $m^2/g$, making shaping operation difficult.

The object of the present invention is to develop a method for measuring the amount of coarse particles in silicon nitride powder and, taking advantage of the developed method, to provide an easy-sintering silicon nitride powder reliably giving a sintered body with a high strength and little fluctuation in characteristics.

Another object of the present invention is to provide a silicon nitride powder which gives a silicon nitride-containing slurry with a low viscosity and a high powder concentration even when a binder is added thereto for shaping.

SUMMARY OF THE INVENTION

The above and other objects of the present invention are attained by a silicon nitride powder having a specific surface area of 6 to 25 $m^2/g$, the number of coarse particles of primary particles, agglomerated particles and/or fused particles having sizes of 3 to 50 μm being not more than 1000 per 1 $cm^3$, the number of foreign metallic particles having sizes of more than 20 μm being not more than 3 per 1 $cm^3$, the number of foreign metallic particles having sizes of 10 to 20 μm being not more than 15 per 1 $cm^3$.

The silicon nitride powder of the present invention may preferably have an amount of adsorbed nitric ion of not more than 150 ppm. Further, the silicon nitride powder may preferably have a total amount of adsorbed acidic inorganic ions of not more than 200 ppm.

The silicon nitride powder of the present invention has a specific surface area of 6 to 25 $cm^2/g$. If the specific surface area of the powder is smaller than 6 $m^2/g$, the amount of coarse grown particles increases. If the specific surface area of the powder is larger than 25 $m^2/g$, the amount of coarse particles of agglomerated and fused particles increases.

It is preferable that the silicon nitride powder of the present invention has an α-phase content of 85% or more. If the silicon nitride powder has an α-phase content of less than 85% and a high β-phase content, the silicon nitride powder was obtained when the crystallizing temperature is 1600° C. or higher, at which high temperature the grain growth, fusing and agglomeration of the silicon nitride particles easily occur to increase in the number of coarse particles.

In the silicon nitride powder of the present invention, the number of coarse particles of primary particles, agglomerated particles and/or fused particles having a size of 3 to 50 μm is not more than 1000/$cm^3$, preferably not more than 700/$cm^3$. If more than 1,000 coarse particles having a size of 3 to 50 μm exist in 1 $cm^3$, in the silicon nitride powder, during the sintering of the silicon nitride, the rate of dissolution of the silicon nitride particles into grain boundaries comprising sintering aids is dispersed and delayed, preventing densification. Also, grain growth, with the coarse particles as nucleus, proceeds during the densification to form a sintered structure including extraordinary grain growth portions with microcracks around the extraordinary grain growth portions, which lowers the strength of the sintered body.

If less than 1,000 coarse particles, having a size of 3 to 50 μm, exist in 1 $cm^3$ of the silicon nitride powder, the rate of dissolution of the silicon nitride particles in the grain boundary phase is uniform and fast so that the structure of the sintered body is uniform, providing a silicon nitride sintered body with a high strength and high reliability.

In general, coarse particles such as coarse primary particles, agglomerated particles and fused particles in silicon nitride powder are so hard that it is difficult to break or comminute them in dry or wet ball milling in preparating a starting powder for sintering. A silicon nitride sintered body is obtained by sintering a shaped body of a mixture of silicon nitride powder and sintering aid. The mixing of the silicon nitride powder and sintering aid is usually conducted by wet ball milling. Accordingly, the coarse particles in the silicon nitride powder remain in the mixture of the silicon nitride powder and sintering aid. The remaining coarse particles are usually removed by passing a silicon nitride powder and sintering aid-containing slurry through a sieve having an opening of about 50 μm. The mesh size of the sieve is at least about 20 μm since, if it is smaller than 50 μm, clogging the sieve suddenly increases. The typical mesh size of the sieve used is around 44 μm. Thus, it is necessary to restrict the number of coarse particles such as coarse primary particles, agglomerated particles and fused particles having a size of less than about 50 μm to a certain level, in order to provide an easy sintering silicon nitride powder for producing a sintered body having a high strength and uniform characteristics.

In accordance with the present invention, a method of measuring the number of coarse particles not more than 50 μm in size such as coarse primary particles, agglomerated particles and/or fuse particles, whose quantitative analysis was difficult, has been developed using a fineness gauge following JIS K5101 or ASTM D 1210 (Pigment Testing Method).

The fineness gauge comprises a measuring portion with a straight tapered path having a linearly increased depth of from 0 to 50 μm, a width of 1.2 cm and a length of 12.5 cm, a slurry dropping portion, contiguous to the measuring portion, having a path with a depth of more than 50 μm, and a scraper for spreading the slurry. The measuring method comprises placing a few drops of a silicon nitride slurry onto the deep end of the path, and sweeping the slurry toward the shallow end with a scraper to draw coarse particles of coarse primary particles, agglomerate particles and/or fused particles, by which linear scratches appear on the path of the fineness gauge. The points appearing the linear scratches in the path are considered to indicate the particle sizes of the coarse particle and the number of the linear scratches are considered to indicate the number of the coarse particles. The number of the coarse particles together with the volume of the inclined path having a depth of from 0 to 50 μm, a width of 1.2 cm and a length of 12.5 cm and the concentration of the silicon nitride slurry are used to calculate the number of the coarse particles in 1 cm³ of the silicon nitride powder.

The silicon nitride powder to be measured is treated with an organic solvent in a wet ball mill to obtain a viscous slurry. If the solvent used is acetone, methanol, ethanol or the like having a relatively low viscosity, the dispersibility of the silicon nitride powder in the solvent is good but the viscosity of the slurry is so low that the slurry is discontinuous while it is drawn by the scraper. Accordingly, an organic solvent having a high viscosity such as liquid paraffin, ethylene glycol and glycerin should be used. Among them, liquid paraffin and glycerin do not have a high dispersibility for silicon nitride powder. Therefore, it is preferred to use ethylene glycol as the solvent since it in inert to the silicon nitride powder and has as adequate viscosity.

The mixing ratio between the silicon nitride powder and ethylene glycol is made to be 20:28 by weight. It is necessary to charge the mixture and 480 silicon nitride balls with a diameter of 5 mm in a plastic bottle having a volume of 100 ml and preliminarily mixing them in a vibration mill with a vibration width of 5 mm for 5 min. If the preliminary mixing is insufficient or is not conducted, the time necessary for wet ball milling becomes very long. If the preliminary mixing is insufficient, an accurate measurement of the coarse particles is difficult since such vibration milling causes communizing of the powder and contamination from the abraded balls. The subsequent ball milling is preferably conducted at 120 rpm for 36 to 60 hours. If the time for ball milling is too short, the dispersion of the silicon nitride powder in the solvent is insufficient and linear scratches increase due to the masses of the undispersed silicon nitride particles, which apparently increases the number of the coarse particles. If the time for ball milling is too long, the particles coagulate again to increase the number of the coarse particles.

In the measurement with the fineness gauge, a few drops of the silicon nitride slurry dropped onto the slurry dropping portion adjacent to the deep end of the path and the placed slurry is slowly swept with the scraper at a rate of 5 cm/sec or less. If the sweeping speed is too high, the slurry is discontinuous.

The particle sizes of the coarse particles such as coarse primary particles, agglomerated particles and/or fused particles in the silicon nitride slurry are read on the scales at the starting points of linear scratches formed by drawing the coarse particles. The number of the coarse particles is obtained by conducting the fineness gauge measurements five times, reading the total number of the linear scratches, and converting it to the number of the coarse particles per 1 cm³ of the silicon nitride particles.

It is noted that it is difficult to measure the coarse particles having a particle size of not larger than 3 µm by this method since it is difficult to observe the presence of, and determine the number of, the linear scratches.

The number of the coarse primary particles, agglomerated particles and/or fused particles in 1 cm³ of the silicon nitride powder is obtained by calculation from the total number of the scratches in five fineness gauge measurements, the volume of the slurry swept into the path and the volume concentration of the silicon nitride powder in the slurry. Here, the theoretical density of the silicon nitride was made to 3.186 g/cm³ and the density of ethylene glycol at room temperature was made to 0.9017 g/cm³. That is, the total number of the scratches obtained from the 5 times measurements was multiplied by a constant of 31.7 to obtain the number of coarse particles in 1 cm³ of the silicon nitride powder.

The silicon nitride powder of the present invention is characterized by the number of metallic foreign particles, having a particle size larger than 30 µm, being not more than 3/cm³ of the silicon nitride powder, preferably 1/cm³, and the number of metallic foreign particles having a particle size of 10 to 20 µm being not more than 15/cm³, preferably 5/cm³. The metallic foreign particles in the starting powder remain as coarse foreign particles in the sintered body and act as the origin and the starting points for fractures.

If the number of metallic foreign particles having a particle size larger than 30 µm is more than 3/cm³ of the silicon nitride powder, weak defect portions are formed in the sintered body, resulting in increased fluctuation of the strength. If the measured strength data are analyzed by the Weibull statistics, the Weibull coefficient is low and unusual data appear on the low strength side, by which the reliability of the analysis is lost. Of course, the material lacks reliability.

The amount of metallic foreign particles is measured by applying ultrasonic waves to 250 g of silicon nitride powder to disperse it and screening it through sieves with openings of 10 µm and 20 µm, respectively. The particles remaining on the sieves are observed through an optical microscope. Alternatively, the metallic foreign particles are collected from the particles on the sieve with a magnet and adhered onto an adhesive tape or sheet, which is observed through an optical microscope. The number of the metallic foreign particles observed through an optical microscope is used to calculate and determine the amount of the metallic foreign particles per 1 cm³ (3.186 g) of silicon nitride powder.

When a silicon nitride sintered body is commercially prepared from a silicon nitride powder, the silicon nitride powder is added to a binder to form a desired shaped body, followed by sintering. It is therefore desired that the silicon nitride slurry has a high powder ratio and a low viscosity after the addition to a binder.

The present inventor investigated the reasons for increasing the viscosity of the slurry in preparing the slurry from silicon nitride powder and a binder and discovered that the viscosity of the slurry is determined predominantly by the amount of the binder such as polyvinyl alcohol adsorbed onto the silicon nitride powder. That is, a binder such as polyvinyl alcohol added to a slurry is adsorbed onto the surface of the silicon nitride particles to lower the surface electric potential or to cover the surface of the particles with hydrophobic groups, which lowers the affinity of the particles with the solvent and increases in the viscosity of the slurry.

The mechanism of adsorbing polyvinyl alcohol, a typical binder, onto the surface of silicon nitride particles is considered.

The solubility of polyvinyl alcohol in water is generally determined by the average polymerization degree and the saponification value thereof. Polyvinyl alcohol has a large number of hydrophilic hydroxide groups. The hydroxide groups form strong hydrogen bonds in and between the molecules, significantly reducing the solubility in water. Polyvinyl alcohol with a low saponification value contains partially hydrophobic acetic groups in place of the hydroxide groups. An adequate amount of the acetic groups, if present, weakens the hydrogen bonds in and between the molecules to improve the solubility of polyvinyl alcohol in water.

The surface of silicon nitride particles has functional groups such as silanol groups (Si—OH) or silazane groups (Si—NH), the concentration of which depends on the conditions of preparing the particles. The functional groups receives and releases proton to the water to form Broensted acid points ($H^+$ providing points) and basic points ($H^+$ receiving points). It is considered that polyvinyl alcohol is adsorbed onto Broensted acid points on the surface of the silicon nitride particles with the hydroxide groups in the polyvinyl alcohol molecule.

Further, as a result of an investigation of the acidity on the surface of silicon nitride particles, it was found that the acidity is varied not only by the above-described surface functional groups but also by adsorbed ions. It is also found that by reducing the amount of adsorbed ions, the acidity can be controlled and a slurry with a low viscosity can be prepared.

It is therefore preferred that the silicon nitride powder has an amount of adsorbed nitric ion of not more than 150 ppm and further an amount of adsorbed acidic inorganic ions of not more than 200 ppm.

The acidic inorganic ions include acid point-forming ions such as nitric ions, halogen ions, sulfate ions, phosphate ions and carbonate ions. Typical acidic inorganic ions which may be contaminated during the process for preparing silicon nitride powder are nitrate ions, fluoride ions, chloride ions and sulfate ions.

The amount of the acidic inorganic ions can be measured by the following method.

1 g of silicon nitride powder is dispersed in 200 g of super-pure distilled water, which is boiled, in a container equipped with a cooler, under reflux for 2 hours to dissolve adsorbed ions into water. The hot slurry immediately after the boiling under reflux is filtered to separate the elute. The resultant solid is again dispersed in super pure distilled water and the elution as above is repeated. The concentration of acidic inorganic ions in the elutes obtained by the above two extraction treatments is determined by ion chromatography using IC-7000S type provided by Yokogawa Electric and, by comparing the weights of the elute and the silicon nitride powder, the concentration of acidic inorganic ions in the silicon nitride powder is obtained.

The silicon nitride powder of the present invention may be prepared by direct nitridation method of a metallic silicon, a carbothermal reduction and nitridation method of silica or thermal decomposition method of silicondiimide.

The silicon diimide thermal decomposition method (imide decomposition method) is the most suitable since it is easy to remove coarse particles and metallic foreign particles from silicon nitride powder. In the imide decomposition method, for example, the amount of toluene remaining in imide is reduced to 0.3% by weight or less, the content of oxygen in a gas supplied to a furnace for calcination and thermal decomposition is controlled to a range of 0.01 to 0.8% by volume, imide is calcinated, while a gas, in an amount of 100 to 400 Nl per 1 kg of imide, the resultant amorphous material is treated in a vibration milling for 15 minutes to dissociate and shatter, and the obtained particles are then heat treated at a temperature of 1400° to 1600° C. to crystallize them. In such a method, silicon nitride powder with a small amount of coarse particles can be obtained.

Further, selection of the material of the pipes for transporting the prepared silicon nitride powder in the air flow and reduction of the pressure of the transporting air flow (3 kg/cm$^3$G or less) make it possible to obtain silicon nitride powder with fewer metallic foreign particles. Moreover, an iron removing treatment is effective to reduce the amount of metallic foreign particles.

A silicon nitride powder with desired properties can be prepared by controlling various conditions as above.

A silicon nitride powder having an amount of adsorbed nitric ion of not more than 150 ppm and an amount of adsorbed acidic inorganic ions of not more than 200 ppm can be prepared by the following method.

Since the imide decomposition method uses silicon halide as a starting material, residual halogen should be reduced. For example, in the step of washing, with liquid ammonia, a nitrogen-containing silane compound such as imide and removing ammonium halide bi-produced during synthesis of the nitrogen-containing silane compound, the content of halide in nitrogen-containing silane compound should be reduced to 200 ppm or less. In the step of calcining and thermally decomposing the above nitrogen-containing silane compound to convert it to amorphous silicon nitride, the oxygen concentration of the atmosphere should be controlled to 2.0% by volume or less, preferably 0.8% by volume or less. By these controls it is possible to reduce the concentration of nitric ion in the silicon nitric powder to not more than 150 ppm. If a silicon nitride powder with more than 150 ppm of adsorbed nitric ion or with more than 200 ppm of adsorbed acidic inorganic ions is formed as a result of insufficient washing of the nitrogen-containing silane compound with liquid ammonia or an increase in the oxygen concentration of the atmosphere during the calcination or another reason, the powder can be washed by immersing the powder in hot water at 80° C. or higher to desorb the adsorbed chemicals and then, to prevent readsorption of the desorbed ions, filtering the powder at a heated temperature of 40° C. or higher, preferably 50° C. or higher to obtain a desired powder.

In the direct nitridation method for metallic silicon powder, for example, a metallic silicon powder with a specific area of 10 m$^2$/g is heated to 1400 to 1500° C. in an atmosphere of mixed hydrogen gas and nitrogen gas or in an atmosphere of mixed ammonia gas and nitrogen gas to obtain a silicon nitride ingot. The ingot is crushed and ground in a conventional means followed by adjusting the particle size by wet or dry comminution with ball milling, vibration milling, jet milling, attrition milling or agitation milling. The obtained particles are treated with an inorganic acid, for example, a mixture of hydrogen fluoride and sulfuric acid, to remove impurities produced during the comminution, and then dried to obtain a silicon nitride powder. For example, in attrition milling, the milling is performed for as long as 0.8 hour or more to effect sufficient comminution and the drying subsequent to the acid treatment is conducted at a temperature of 100° C. or lower, by which a silicon nitride powder with fewer coarse particles can be prepared. Also, by conducting the acid treatment of the powder using a high concentration of an inorganic acid such as 1.0% by weight or more of hydrogen fluoride or 10% by weight or more of sulfuric acid (an amount of the powder in the treating solution is about 10% by weight), at a temperature of 40° C. or higher for a treatment time of 10 hours or more, a silicon nitride powder with less metallic foreign particles can be obtained. Further, magnetic iron removal treatment is effective to decrease the number of metallic foreign particles. Thus, a silicon nitride powder with desired properties can be prepared even by the direct nitridation method of metallic silicon powder.

Moreover, a silicon nitride powder with an amount of adsorbed nitric ion of 150 ppm or less and an amount of adsorbed acidic inorganic ion of 200 ppm or less can be prepared in the following methods.

In the direct nitridation method, remaining of inorganic ions from a mixed acid used in the mixed acid treatment subsequent to comminution of nitridated ingot in the problem.

The mixed acid treatment is usually conducted with hydrofluoric acid in combination with an inorganic acid such as hydrochloric acid, sulfuric acid and nitric acid. The concentration of the hydrofluoric acid used is usually 0.02 to 0.2 gHF/gSi$_3$N$_4$ and the concentration of the other inorganic acid is usually 1.0 to 2.0 g/gSi$_3$N$_4$. If a dry comminuting method is used, the concentration of the mixed acid used can be reduced. The higher the concentration of the mixed acid, the higher the concentration of residual acidic inorganic ions. Nevertheless, even under usual treatment conditions, the total amount of the adsorbed acidic inorganic ions exceeds 200 ppm.

Such a powder treated with a mixed acid can be subjected to washing by immersion in a hot water at a temperature of 70° C. or higher, preferably 80° C. or higher to remove the adsorbed ions and then, to prevent readsorption of the desorbed ions, filtration at a heated temperature of 40° C. or higher, preferably 50° C. or higher, by which a desired powder is obtained.

In the carbothermal reduction and nitridation method of silica, for example, a mixture of silicon nitride powder with a specific surface area of 10 m$^2$/g or more, silica powder with a specific surface area of 100 m$^2$/g or more and carbon black powder with a specific surface area of 50 m$^2$/g or more is used as the starting material which is heated in a nitrogen gas flow to prepare a silicon nitride powder. Using pure starting powders having a number of foreign metallic particles more than 20 μm in size of 3/cm$^3$ or less and a number of foreign metallic particles 10 to 20 μm in size of 15/cm$^3$ or less as well as selecting the material of pipes of transporting the prepared silicon nitride powder and reduction of the pressure of transporting gas flow, it is possible to obtain a silicon nitride powder with fewer foreign metallic particles. Magnetic iron removal is effective to further reduce the number of foreign metallic particles.

Also, a silicon nitride powder with fewer coarse particles can be prepared by adding 1 part by weight of silica to 2 parts by weight of carbon and 0.1 part by weight of silicon nitride, mixing the mixture, pelletizing the mixture, firing the pellets at a temperature of 1450° C. or lower, and gradually or slowly removing the carbon from the resultant powder in air at a temperature of 680° C. or lower for 4 hours or more. The thus obtained particles are subjected to weak crushing treatment with a vibration mill made of nylon, to thereby obtain a silicon nitride powder with the desired properties.

EXAMPLES

The present invention will be described more concrete with reference to examples and comparative examples.

The evaluation of the properties of a sintered body made from a silicon nitride powder was conducted using the Archimedes method for the bulk density and the bending strength test under JIS-R1601 for the four point bending load.

(1) Number of coarse particles (pieces/cm$^3$Si$_3$N$_4$): measured with a fineness gauge sold by Taiyu Kizai K.K. (JIS K5101)

(2) Relative density (%): Archimedes method (3) Four point bending strength (kg/mm$^2$): measured with Autograph DSS-500 type sold by Shimaze Seisakusho K. K.

Examples 1-7 and Comparative Examples 1-5

Silicon nitride powders were prepared by the imide decomposition method under the conditions as shown in Table 1.

TABLE 1

| | Washing conditions of imide Total amount of washing liquid Amounts of imide (1/kg) | Thermal-decomposition Oxygen conc. of supply gas to calcination furnace (vol %) | Packing density of amorphous silicon nitride (g/cm$^3$) | Vibration milling Amplitude (mm) | Vibration milling Treatment time (minute) | Condition of heating Tem. raising rate (°C./h) | Gas flow transportation Material of transporting pipe | Gas flow transportation Pressure of transporting gas (kg/cm$^2$G) | Iron removal* |
|---|---|---|---|---|---|---|---|---|---|
| Example | | | | | | | | | |
| 1 | 50 | 0.3 | 0.11 | 10 | 25 | 50 | fluorine resin-coated steel pipe | 1.5 | yes |
| 2 | 100 | 0.1 | 0.07 | 10 | 30 | 50 | fluorine resin-coated steel pipe | 2.0 | yes |
| 3 | 100 | 0.5 | 0.08 | 7 | 30 | 50 | fluorine resin-coated steel pipe | 1.5 | no |
| 4 | 50 | 0.5 | 0.10 | 10 | 20 | 25 | stain less steel pipe SUS304TP | 1.5 | no |
| 5 | 100 | 0.2 | 0.15 | 7 | 30 | 80 | stain less steel pipe SUS304TP | 2.5 | yes |
| 6 | 50 | 0.4 | 0.14 | 7 | 30 | 50 | stain less steel pipe SUS304TP | 1.5 | yes |
| 7 | 100 | 0.05 | 0.22 | 7 | 40 | 50 | stain less steel pipe SUS304TP | 2.5 | no |

TABLE 1-continued

| | Washing conditions of imide Total amount of washing liquid Amounts of imide (l/kg) | Thermal-decomposition Oxygen conc. of supply gas to calcination furnace (vol %) | Packing density of amorphous silicon nitride (g/cm³) | Vibration milling | | Condition of heating Tem. raising rate (°C./h) | Gas flow transportation | | Iron removal* |
|---|---|---|---|---|---|---|---|---|---|
| | | | | Amplitude (mm) | Treatment time (minute) | | Material of transporting pipe | Pressure of transporting gas (kg/cm²G) | |
| Comp. Ex. | | | | | | | | | |
| 1 | 100 | 1.0 | 0.19 | 7 | 20 | 50 | stain less steel pipe SUS304TP | 2.5 | yes |
| 2 | 25 | 0.5 | 0.15 | 7 | 10 | 50 | stain less steel pipe SUS304TP | 1.5 | no |
| 3 | 100 | 0.3 | 0.06 | 7 | 25 | 50 | carbon steel pipe STPG38 | 3.5 | no |
| 4 | 50 | 0.9 | 0.16 | 7 | 5 | 50 | stain less steel pipe SUS304TP | 2.5 | no |
| 5 | 200 | 1.8 | 0.16 | 7 | 10 | 150 | stain less steel pipe SUS304TP | 1.5 | yes |

*Iron removal through a magnetic iron removing machine at 15,000 gauss.

The properties of the resultant silicon nitride powders are shown in Table 2. The number of the coarse particles was measured by the following method.

20 g of silicon nitride powder together with 28 g of ethylene glycol and 480 silicon nitride balls with 5 mm-diameter were charged in a polyethylene bottle with a volume of 100 ml and the closed bottle was preliminarily mixed by vibration milling with a vibration width of 5 mm for 5 min. The bottle was then subjected to ball milling at 120 rpm for 48 hours. A few drops of the obtained slurry were dropped onto the slurry dropping portion adjacent to the deep end of the path of fineness gauge and slowly swept at a rate of 5 cm/sec. The number of coarse particles having a particle size of 3 to 50 μm was read from the number of linear scratches appearing on the fineness gauge. The same measurements were conducted four more times. The total number of the linear scratches for the five measurements was converted to the number of the coarse particles per 1 cm³.

TABLE 2

| | Specific surface area (m²/g) | Oxygen content (wt %) | α-phase content (wt %) | Amount of coarse particles (number/cm³) | Foreign metallic particles (number/cm³) | |
|---|---|---|---|---|---|---|
| | | | | | 20 μm or more | 10–20 μm |
| Ex. | | | | | | |
| 1 | 11.0 | 1.35 | 97.1 | 317 | 0.02 | 0.2 |
| 2 | 10.7 | 1.22 | 97.9 | 172 | 0.05 | 0.4 |
| 3 | 10.9 | 1.30 | 97.8 | 634 | 0.1 | 0.6 |
| 4 | 11.0 | 1.24 | 97.3 | 412 | 0.3 | 1.2 |
| 5 | 11.2 | 1.19 | 94.0 | 602 | 0.4 | 1.2 |
| 6 | 10.7 | 1.26 | 95.5 | 666 | 0.2 | 0.8 |
| 7 | 10.0 | 1.10 | 80.0 | 476 | 0.5 | 2.0 |
| Comp. Ex. | | | | | | |
| 1 | 8.8 | 1.72 | 88.0 | 1046 | 0.4 | 1.6 |
| 2 | 10.8 | 1.31 | 94.5 | 1141 | 0.3 | 0.9 |
| 3 | 10.3 | 1.21 | 98.1 | 697 | 5.0 | 18.0 |
| 4 | 5.1 | 1.60 | 93.0 | 1427 | 0.5 | 1.5 |
| 5 | 27.0 | 2.60 | 93.0 | 1268 | 0.2 | 0.7 |

The amounts of adsorbed inorganic ions were measured for the resultant silicon nitride powders and the results are shown in Table 3.

The silicon nitride powders were used to prepared a silicon nitride powder water-based slurry. The process conditions were the following.

93% by weight of the silicon nitride powder, 5% by weight of yttria powder and 2% by weight of alumina powder were mixed, to which deionized pure water was added to 50% by weight of the powder mixture. Further, 0.3% by weight of diethyl amine as a dispersing agent and by weight of polyvinyl alcohol (PVA 205C by Kuraray Corp. Ltd., average polymerization degree of 550, saponification value of 88.0%) as a binder, both based on the total weight of the mixed powder, were added to the mixture of the powder and water, which was then mixed and milled in a ball milling for 24 hours.

The resultant slurry was subjected to measurement of viscosity using an E-type viscometer at 20° C. at 0.5 rpm. The results are shown in Table 3.

The viscosities of the slurries were in a range of 90 to 850 cP. A slurry with a viscosity of not more than 500 cP can be used satisfactorily.

TABLE 3

| | Amount of Adsorbed ions (ppm) | | | | | Viscosity of slurry (cP) |
|---|---|---|---|---|---|---|
| | $NO_3^-$ | $F^-$ | $Cl^-$ | $SO_4^-$ | Total | |
| Ex. | | | | | | |
| 1 | 50 | <10 | 80 | 20 | 160 | 190 |
| 2 | 30 | <10 | 40 | 25 | 105 | 90 |
| 3 | 55 | <10 | 40 | 20 | 125 | 205 |
| 4 | 55 | <10 | 70 | 25 | 160 | 220 |
| 5 | 40 | <10 | 35 | 15 | 100 | 120 |
| 6 | 55 | <10 | 75 | 20 | 160 | 240 |
| 7 | 20 | <10 | 45 | 15 | 90 | 80 |

TABLE 3-continued

| | Amount of Adsorbed ions (ppm) | | | | | Viscosity of slurry (cP) |
|---|---|---|---|---|---|---|
| | $NO_3^-$ | $F^-$ | $Cl^-$ | $SO_4^-$ | Total | |
| Comp. Ex. | | | | | | |
| 1 | 70 | <10 | 35 | 25 | 140 | 270 |
| 2 | 50 | <10 | 150 | 40 | 250 | 450 |
| 3 | 40 | <10 | 40 | 20 | 110 | 125 |
| 4 | 50 | <10 | 60 | 10 | 130 | 180 |
| 5 | 160 | <10 | 20 | 10 | 200 | 850 |

Examples 8–13 and Comparative Examples 6–10

Using the direct nitridation method, silicon nitride powders were prepared under the conditions as shown in Table 4.

The properties of the resultant silicon nitride powders are shown in Tables 5 and 6.

TABLE 4

| | Nitridation at 1150–1450° C. | | Heat treatment of ingot after the nitridation (°C.-h) | Communiting time in attriter (hours) | Mixed acid treatment | | | | | Tem. of drying filter cake (°C.) | Ion removal* |
|---|---|---|---|---|---|---|---|---|---|---|---|
| | Oxygen conc. in nitridation furace (vol %) | Heating rate (°C./h) | | | Conc. of hydro-fluoric acid (wt %) | Conc. of sulforic acid (wt %) | Conc. of nitric acid (wt %) | Treatment temp. (°C.) | Treatment time (hours) | | |
| Ex. | | | | | | | | | | | |
| 8 | 0.2 | 6 | 1550-4 | 2.0 | 1.5 | 25 | 0 | 60 | 24 | 90 | yes |
| 9 | 0.1 | 5 | 1550-4 | 1.0 | 2.0 | 20 | 0 | 60 | 24 | 90 | yes |
| 10 | 0.4 | 10 | 1700-2 | 3.0 | 1.0 | 15 | 0 | 60 | 15 | 80 | no |
| 11 | 0.1 | 14 | 1750-5 | 1.0 | 1.5 | 10 | 0 | 60 | 15 | 75 | yes |
| 12 | 0.2 | 7 | 1700-3 | 0.9 | 1.5 | 9 | 9 | 50 | 24 | 75 | yes |
| 13 | 0.3 | 8 | 1700-3 | 1.0 | 1.2 | 7.5 | 6 | 50 | 24 | 80 | yes |
| Comp. Ex. | | | | | | | | | | | |
| 6 | 0.2 | 8 | 1550-4 | 0.5 | 1.2 | 15 | 0 | 60 | 24 | 140 | yes |
| 7 | 0.2 | 7.5 | 1550-4 | 1.5 | 1.5 | 20 | 0 | 60 | 15 | 140 | yes |
| 8 | 0.2 | 14 | 1750-5 | 0.5 | 1.8 | 15 | 0 | 50 | 12 | 180 | no |
| 9 | 0.005 | 7 | 1550-4 | 1.0 | 1.0 | 5 | 0 | 30 | 5 | 60 | no |
| 10 | 0.4 | 12 | 1700-5 | 6.0 | 1.0 | 15 | 0 | 50 | 18 | 90 | no |

*Iron removal through a magnetic iron removing machine at 15,000 gauss.

TABLE 5

| | Specific surface area (m²/g) | Oxygen content (wt %) | α-phase content (wt %) | Amount of coarse particles (number/cm³) | Foreign metallic particles (number/cm³) | |
|---|---|---|---|---|---|---|
| | | | | | 20 µm or more | 10–20 µm |
| Ex. | | | | | | |
| 8 | 12.8 | 1.43 | 95.0 | 729 | 0.2 | 1.0 |
| 9 | 10.6 | 1.25 | 97.0 | 888 | 0.4 | 2.0 |
| 10 | 16.4 | 1.82 | 70.0 | 539 | 0.6 | 3.0 |
| 11 | 10.6 | 1.29 | 30.0 | 634 | 0.5 | 1.5 |

TABLE 5-continued

|  | Specific surface area (m²/g) | Oxygen content (wt %) | α-phase content (wt %) | Amount of coarse particles (number/cm³) | Foreign metallic particles (number/cm³) 20 μm or more | 10-20 μm |
| --- | --- | --- | --- | --- | --- | --- |
| 12 | 7.6 | 1.30 | 92.0 | 900 | 0.5 | 1.2 |
| 13 | 10.2 | 1.50 | 90.0 | 700 | 0.5 | 2.2 |
| Comp. Ex. | | | | | | |
| 6 | 8.6 | 1.57 | 91.0 | 1205 | 0.5 | 2.5 |
| 7 | 11.5 | 1.51 | 92.2 | 1078 | 0.3 | 1.5 |
| 8 | 8.3 | 1.41 | 30.0 | 1427 | 0.8 | 3.2 |
| 9 | 10.3 | 1.14 | 92.8 | 444 | 5.0 | 21.0 |
| 10 | 27.5 | 2.31 | 60.0 | 602 | 0.7 | 2.8 |

TABLE 6

| | Amount of adsorbed ions (ppm) | | | | |
| --- | --- | --- | --- | --- | --- |
| | $NO_3^-$ | $F^-$ | $Cl^-$ | $SO_4^-$ | Total |
| Example | | | | | |
| 8 | 15 | 240 | 95 | 200 | 545 |
| 9 | 10 | 280 | 85 | 150 | 525 |
| 10 | 20 | 180 | 155 | 120 | 465 |
| 11 | 10 | 225 | 100 | 100 | 435 |
| 12 | 190 | 220 | 105 | 90 | 605 |
| 13 | 90 | 205 | 135 | 80 | 510 |
| Comparative Example | | | | | |
| 6 | 10 | 200 | 140 | 130 | 480 |
| 7 | 10 | 230 | 100 | 150 | 490 |
| 8 | 10 | 260 | 90 | 120 | 480 |
| 9 | 10 | 190 | 145 | 70 | 415 |
| 10 | 20 | 185 | 150 | 120 | 465 |

Examples 14–19

The silicon nitride powders obtained in accordance with the above direct nitridation method were treated as described below.

50 g of the silicon nitride powder was dispersed in 950 ml of superpure distilled water, heated to the temperature shown in Table 7 and sufficiently stirred for 2 hours to conduct washing. The heating was stopped and the slurry was allowed to cool for 30 minutes and, when the slurry had a temperature as shown in Table 7, it was filtered and washed with water having the same temperature. The resultant cake was vacuum dried at 70° C. The properties of the silicon nitride powder are shown in Table 7.

Using the obtained powder, a silicon nitride powder water-based slurry was prepared and the viscosity of the slurry was measured with an E type viscometer at 0.5 rpm at 20° C., in the same manner as in Example 1. The results are shown in Table 7.

The silicon nitride powder prepared by the direct nitridation method, with the same as the silicon nitride powder prepared by the imide decomposition method, can be used to prepare a low viscosity slurry if its amount of adsorbed nitric ion is 150 ppm or lower, and the viscosity of the slurry is further reduced if the amount of adsorbed acidic inorganic ions is 200 ppm or lower.

TABLE 7

| Example | $Si_3N_4$ powder used | Hot water cleaning Washing temp. (°C.) | Hot filtering Filtering temp. (°C.) | Properties of powder Amount of adsorbed ions (ppm) | | | | | Viscosity of slurry (cP) |
| --- | --- | --- | --- | --- | --- | --- | --- | --- | --- |
| | | | | $NO_3^-$ | $F^-$ | $Cl^-$ | $SO_4^-$ | Total | |
| 14 | Example 8 | 90 | 70 | 5 | 90 | 25 | 40 | 160 | 200 |
| 15 | Example 10 | 90 | 50 | 10 | 105 | 25 | 50 | 190 | 250 |
| 16 | Example 12 | 100 | 80 | 5 | 70 | 20 | 10 | 105 | 180 |
| 17 | Example 13 | 80 | 50 | 40 | 120 | 55 | 45 | 260 | 490 |
| 18 | Example 8 | 60 | 50 | 10 | 170 | 55 | 90 | 325 | 290 |
| 19 | Example 12 | 60 | 30 | 160 | 155 | 65 | 55 | 435 | >1200 |

The characteristics of the sintered bodies prepared from the silicon nitride powders prepared in Examples 1 to 13 and Comparative Examples 1 to 10 were evaluated.

93% by weight of silicon nitride powder was added to 5 5% by weight of $Y_2O_3$ and 2% by weight of $Al_2O_3$ as sintering aids, ethanol was added, and the mixture was mixed in a ball mill for 48 hours. After drying, the granules was die-pressed under a pressure of 300 kg/cm² into a shaped body 6×45×75 mm and followed by CIP treatment under a pressure of 1500 kg/cm². The shaped body was charged in a silicon nitride crucible and sintered in a nitrogen gas atmosphere at 1780° C. for 2 hours to obtain a sintered body.

The sintered body was subjected to cutting and grinding to prepare test-pieces and the relative density and the four point bending strength at room temperature of the samples were measured. The results are shown in Table 8.

It was found that, in accordance with the silicon nitride powder of the present invention, sintered silicon nitride bodies with a high strength and without fluctuation in the properties can be reliably obtained.

TABLE 8

|  | Relative density (%) | Four point bending strength (kg/mm²) | Weibull modulus |
|---|---|---|---|
| Example |  |  |  |
| 1 | 98.5 | 115.0 | 28 |
| 2 | 98.8 | 118.0 | 30 |
| 3 | 98.7 | 112.6 | 26 |
| 4 | 97.8 | 110.8 | 28 |
| 5 | 97.9 | 104.0 | 26 |
| 6 | 98.1 | 106.6 | 24 |
| 7 | 96.8 | 89.0 | 19 |
| 8 | 97.0 | 95.0 | 24 |
| 9 | 96.7 | 95.6 | 25 |
| 10 | 96.5 | 86.0 | 18 |
| 11 | 97.1 | 87.4 | 16 |
| 12 | 96.4 | 85.0 | 17 |
| 13 | 97.2 | 89.0 | 22 |
| Comparative Example |  |  |  |
| 1 | 93.0 | 70.0 | 9.0 |
| 2 | 93.6 | 74.3 | 9.5 |
| 3 | 94.9 | 72.1 | 7.0 |
| 4 | 90.0 | 53.5 | 10 |
| 5 | 94.2 | 68.0 | 8.5 |
| 6 | 92.8 | 67.0 | 9.0 |
| 7 | 94.8 | 65.3 | 8.5 |
| 8 | 90.7 | 58.5 | 8.0 |
| 9 | 94.6 | 64.0 | 5.0 |
| 10 | 92.4 | 54.0 | 8.0 |

Example 21

The silicon nitride powder water-based slurries prepared in Examples 1 to 7 and Examples 14 to 17 were used to conduct slip casting.

The slurry, which had been subjected to vacuum degassing, was poured into a plaster mold to deposit on the surface of the mold. When the deposit reached a predetermined thickness, the excess slurry was discharged. After the discharge, the mold was allowed to stand for 16 hours so that the cast body was hardened, and it was then demolded and further dried.

The thus obtained shaped bodies had excellent shapes and were without cracks.

The silicon nitride powder water-based slurries prepared in Examples 8 to 13 and Examples 18 to 19 were also used to conduct slip casting in the same manner as above.

The obtained shaped bodies were not excellent in shape and cracks appeared after drying.

It can be seen from the above results that with the amount of adsorbed acidic inorganic ions being a predetermined value or less, an excellent slurry with a low viscosity and a high powder concentration can be easily obtained even if a shaping binder is added.

Example 22

The silicon nitride powder water-based slurry prepared in Examples 1 to 7 and Examples 14 to 17 was supplied by a slurry transportation pump to a spray drying apparatus where the slurry was spray dried under the conditions of a hot air temperature of 150° C. and an atomizer rotation speed of 8000 rpm to granules.

The resultant granules were spherical with an excellent flowability and had an average particle size of 39 to 85 µm as shown in Table 9.

When the silicon nitride powder water-based slurry prepared in Example 12 was used to try to conduct the spray drying in the same manner as above, the slurry clogged the transportation tube near the outlet thereof and thus spray drying could not be carried out.

TABLE 9

| Example No. | Viscosity of slurry (cP) | Average particle size of spray dried granules (µm) |
|---|---|---|
| 1 | 190 | 48 |
| 2 | 90 | 40 |
| 3 | 205 | 50 |
| 4 | 220 | 52 |
| 5 | 120 | 42 |
| 6 | 240 | 54 |
| 7 | 80 | 39 |
| 14 | 200 | 49 |
| 15 | 250 | 55 |
| 16 | 180 | 46 |
| 17 | 490 | 85 |
| 12 | >1200 | impossible to spray dry |

The granules obtained by spray drying the silicon nitride powder water-based slurry prepared in Examples 1 to 7 and Examples 14 to 17 was used to mold, under a pressure of 500 kg/cm², a shaped body of 6×45×75 mm followed by CIP treatment under a pressure of kg/cm². The shaped body was charged in a silicon nitride crucible and sintered in a nitrogen gas atmosphere at 1780° C. for 2 hours to obtain a sintered body.

The sintered body was subjected to cutting and grinding to prepare test pieces and the relative density and the four point bending strength, at room temperature, of the samples were measured. The results are shown in Table 10.

It can be seen from the above that by controlling the amount of adsorbed acidic inorganic ions to a predetermined level or less, a silicon nitride powder-containing slurry with a low viscosity and a high powder concentration can be easily obtained even if an organic binder for shaping is added, which indicates that when the water-based slurry with an organic binder for shaping is formed into a shaped body and sintered, the obtained sintered body has characteristics similar to those of a sintered body obtained using an organic solvent such as ethanol, and thus the silicon nitride powder in accordance with the present invention is suitable and preferable for commercially preparing a sintered silicon nitride body.

TABLE 10

| Example No. | Relative density (%) | Four point bending strength (kg/mm$^2$) | Weibull modulus |
|---|---|---|---|
| 1 | 98.4 | 120.0 | 33 |
| 2 | 98.7 | 123.0 | 35 |
| 3 | 98.6 | 118.0 | 31 |
| 4 | 97.7 | 115.0 | 33 |
| 5 | 97.8 | 109.0 | 31 |
| 6 | 98.0 | 112.0 | 29 |
| 7 | 96.7 | 94.0 | 24 |
| 14 | 96.7 | 94.0 | 25 |
| 15 | 96.2 | 85.0 | 19 |
| 16 | 96.1 | 84.0 | 19 |
| 17 | 96.9 | 88.0 | 23 |

We claim:

1. A silicon nitride powder having a specific surface area of 6 to 25 m$^2$/g, in which the number of coarse particles of coarse primary particles, agglomerated particles and fused particles having a size of 3 to 50 μm is not more than 1000 per cm$^3$ of the powder, the number of foreign metallic particles having a size of more than 20 μm is not more than 3 per cm$^3$ of the powder, the number of foreign metallic particles having a size of 10 to 20 μm is not more than 15 per cm$^3$ of the powder, and wherein the amount of acidic inorganic ions adsorbed on the silicon nitride powder is not more than 200 ppm.

2. The silicon nitride powder according to claim 1 wherein said silicon nitride powder has an α-phase content of not less than 85%.

3. The silicon nitride powder according to claim 1 wherein the number of said coarse particles in said silicon nitride powder, having a size of 3 to 50 μm, is not more than 700 per 1 cm$^3$ of the powder.

4. The silicon nitride powder according to claim 1 wherein the number of foreign metallic particles in said silicon nitride powder, having a size of more than 20 μm, is not more than 1 per 1 cm$^3$ of the powder.

5. The silicon nitride powder according to claim 1 wherein the number of foreign metallic particles in said silicon nitride powder, having a size of 10 to 20 μm, is not more than 5 per 1 cm$^3$ of the powder.

6. The silicon nitride powder according to claim 1, wherein the amount of nitric ions adsorbed on the silicon nitride powder is not more than 150 ppm.

7. A water-based slurry comprising the silicon nitride powder as set forth in claim 1, an organic binder and water.

8. The water-based slurry according to claim 7 wherein said organic binder is polyvinyl alcohol.

9. The water-based slurry according to claim 7 wherein said slurry has a viscosity of not more than 500 cP.

10. The water-based slurry according to claim 7 wherein said slurry further comprises a sintering aid.

11. The water-based slurry according to claim 7 wherein said slurry has a ratio of nitride powder to water of about 40 to 70 wt %.

* * * * *